United States Patent
Chu et al.

(10) Patent No.: US 9,544,267 B2
(45) Date of Patent: Jan. 10, 2017

(54) OUT-OF BAND CONFIGURATION OF IP ADDRESSES

(71) Applicant: Quanta Computer Inc., Tao Yuan Shien (TW)

(72) Inventors: Hung-Lu Chu, Taoyuan County (TW); Chin-Fu Tsai, Taoyuan County (TW); Yung-Fu Li, Taoyuan County (TW)

(73) Assignee: QUANTA COMPUTER INC., Taoyuan (TW)

( * ) Notice: Subject to any disclaimer, the term of this patent is extended or adjusted under 35 U.S.C. 154(b) by 0 days.

(21) Appl. No.: 14/537,342

(22) Filed: Nov. 10, 2014

(65) Prior Publication Data
US 2016/0028685 A1   Jan. 28, 2016

(30) Foreign Application Priority Data
Jul. 22, 2014 (TW) .............................. 103125064 A

(51) Int. Cl.
*H04L 29/12* (2006.01)
*H04L 29/08* (2006.01)
*H04L 12/24* (2006.01)

(52) U.S. Cl.
CPC ....... *H04L 61/2007* (2013.01); *H04L 41/0806* (2013.01); *H04L 67/303* (2013.01)

(58) Field of Classification Search
CPC ........... H04L 29/12216; H04L 61/2015; H04L 41/0806; H04L 61/2007; H04L 67/34; G06F 9/4416; G06F 11/1417; G06F 15/177
(Continued)

(56) References Cited

U.S. PATENT DOCUMENTS 6,810,478 B1 * 10/2004 Anand et al. ..................... 713/2
7,200,678 B1 * 4/2007 Bettadahalli ........ H04L 61/2015
   370/401
(Continued)

FOREIGN PATENT DOCUMENTS

JP   2013206392 A   10/2013
TW   200826547       6/2008
(Continued)

OTHER PUBLICATIONS

Droms, RFC 2131: Dynamic Host Configuration Protocol, Mar. 1997, Network Working Group of IETF, www.ietf.org/rfc/rfc2131.txt.*
Pruett et al., "BladeCenter systems management software", IBM Journal of Research and Development (Nov. 2005) 49(6): 963-975.
Extended European Search Report mailed in European Application No. 15165203.9 on Dec. 8, 2015.
(Continued)

*Primary Examiner* — Ruolei Zong
(74) *Attorney, Agent, or Firm* — Nixon Peabody LLP

(57) ABSTRACT

In some implementations, an IP address can be configured for a computing device using an out-of-band communication channel. For example, a system administrator can configure a system controller (e.g., baseband management controller) with an IP address using an out-of-band communication channel. In some implementations, the system controller can be configured with the IP address when the computing device is powered down. The system controller can store the IP address in memory associated with the system controller. In some implementations, an operating system of the computing device can be configured with an agent (e.g., process, application, utility) that will request the IP address from the system controller and configure the computing device to use the IP address. For example, the operating system agent can use various operating system commands to configure the IP address for the computing device based on the IP address received from the system controller.

22 Claims, 4 Drawing Sheets

(58) Field of Classification Search
USPC .......................................................... 709/220
See application file for complete search history.

(56) References Cited

U.S. PATENT DOCUMENTS

| | | | |
|---|---|---|---|
| 7,542,467 | B2 | 6/2009 | Rothman et al. |
| 7,831,997 | B2 | 11/2010 | Eldar et al. |
| 8,547,825 | B2 | 10/2013 | Armstrong et al. |
| 8,560,686 | B2 | 10/2013 | Ramamurthy |
| 8,650,269 | B2 | 2/2014 | Nguyen et al. |
| 8,719,410 | B2 | 5/2014 | Jreij et al. |
| 8,745,438 | B2 | 6/2014 | Armstrong et al. |
| 2005/0071677 | A1* | 3/2005 | Khanna et al. ............... 713/201 |
| 2005/0132084 | A1 | 6/2005 | Cheng et al. |
| 2005/0132360 | A1* | 6/2005 | Chu ..................... G06F 9/4416 717/177 |
| 2005/0216911 | A1* | 9/2005 | Yen et al. .................... 717/176 |
| 2005/0271049 | A1* | 12/2005 | Jain ......................... H04L 29/06 370/389 |
| 2007/0140109 | A1* | 6/2007 | Lobig ..................... H04L 12/24 370/217 |
| 2008/0172476 | A1 | 7/2008 | Daniel et al. |
| 2011/0202685 | A1 | 8/2011 | Subramaniam et al. |
| 2012/0124242 | A1* | 5/2012 | Chen et al. ................... 709/250 |
| 2013/0254566 | A1 | 9/2013 | Florez-Larrahondo et al. |
| 2013/0262700 | A1 | 10/2013 | Tamura |
| 2013/0289926 | A1 | 10/2013 | Maity et al. |
| 2014/0082218 | A1 | 3/2014 | Yu et al. |
| 2014/0198788 | A1 | 7/2014 | Nguyen et al. |
| 2014/0280947 | A1 | 9/2014 | Christopher et al. |
| 2014/0344475 | A1* | 11/2014 | Chen ................... H04L 61/2053 709/245 |

FOREIGN PATENT DOCUMENTS

| | | |
|---|---|---|
| TW | 201324345 | 6/2013 |
| TW | 201324355 | 6/2013 |
| TW | 201423595 | 6/2014 |
| WO | 2012050590 A1 | 4/2012 |
| WO | 2014087507 | 6/2014 |

OTHER PUBLICATIONS

Anonymous: "networking—How to reserve IP Address in DHCP Server—Ask Ubuntu", Dec. 18, 2013, pp. 1-2, XP055232322, Retrieved from the Internet: URL: http://askubuntu.com/questions/392599/how-to-reserve-ip-address-in-dhcp-server [retrieved on Nov. 30, 2015] *the whole document*.

Aaron Kelly: "Have Ubuntu Server hand out "static" or "fixed" addresses via DHCP aaron-kelley.net", Jan. 4, 2011, pp. 1-2, XP055232329, Retrieved from the Internet: URL: http://aaron-kelley.net/blog/2011/01/have-ubuntu-server-hand-out-static-or-fixed-addresses-via-dhcp/ [retrieved on Nov. 30, 2015] *the whole document*.

Kim Kinnear Mark Stapp Cisco Systems et al: "Bulk DHCPv4 Lease Query; draft-ietf-dhc-dhcpv4-bulkleasequery-07.txt", Bulk DHCPV4 Lease Query; Draft-IETF-DHC-DHCPV4-Bulk-Leasequery-07.txt Internet Engineering Task Force, IETF; Standardworkingdraft, Internet Society (ISOC) 4, Rue des Falaises CH—1205 Geneva, Switzerland, Oct. 15, 2012 (Oct. 15, 2012), pp. 1-40 XP015087861, [retrieved on Oct. 15, 2012] * Chapter 4 *.

Droms Bucknell University R: "Dynamic Host Configuration Protocol; rfc2131.txt", 5. JCT-VC Meeting; 96. MPEG Meeting; Mar. 16, 2011-Mar. 23, 2011; Geneva; (Joint Collaborative Team on Video Coding of ISO/IEC JTC1/SC29/WG11 and ITU-T SG.16 ); URL: http://wftp3.itu.int/av-arch/jctvc-site/, Internet Engineering Task Force, IETF, CH, Mar. 1, 1997 (Mar. 1, 1997), XP015007915, ISSN: 0000-0003 * Chapters 2 and 3. *.

Office Action mailed in Taiwanese Application No. 103125064 on Jan. 26, 2016.

English language summary of Office Action mailed in Taiwanese Application No. 103125064 on Jan. 26, 2016.

English language translation of Abstract of Taiwanese Application TW 201324355.

Japanese Office Action mailed Feb. 2, 2016 for counterpart Japanese Application No. 2015-086895.

Intel, Hewlett-Packard, NEC, Dell,—IPMI—Intelligent Platform Management Interface Specification Second Generation, v2.0, Document Revision 1.0, Feb. 12, 2004.

Japanese Office Action, Tokugan 2015-086895, dated Jun. 14, 2016.

* cited by examiner

OUT-OF BAND CONFIGURATION OF IP ADDRESSES

TECHNICAL FIELD

The disclosure generally relates to configuring an internet protocol (IP) address for a computing device.

BACKGROUND

Conventionally, an Internet protocol (IP) address for a computing device can be configured manually or by using a dynamic host configuration protocol (DHCP) service. For example, a computing device can be dynamically configured with an IP address when, upon startup of the computing device, the computing device establishes a connection to a DHCP server and receives a dynamically allocated IP address from the server. However, if the computing device administrator wishes to specify a static IP address for the computing device, the administrator will often have to log in to the operating system of the computing device and use various system commands to set the IP address for the computing device. In either case, the computing device and operating system must be running before the IP address can be configured for the computing device.

SUMMARY

In some implementations, an IP address can be configured for a computing device using an out-of-band communication channel. For example, a system administrator can configure a system controller (e.g., baseband management controller) with an IP address using an out-of-band communication channel. In some implementations, the system controller can be configured with the IP address when the computing device is powered down. The system controller can store the IP address in memory associated with the system controller. In some implementations, an operating system of the computing device can be configured with an agent (e.g., process, application, utility) that will request the IP address from the system controller and configure the computing device to use the IP address. For example, the operating system agent can use various operating system commands to configure the IP address for the computing device based on the IP address received from the system controller.

Particular implementations provide at least the following advantages: A system administrator can configure an IP address of a computing device (e.g. a server) prior to booting or while the computing device is in a low power state.

Details of one or more implementations are set forth in the accompanying drawings and the description below. Other features, aspects, and potential advantages will be apparent from the description and drawings, and from the claims.

DESCRIPTION OF DRAWINGS

Like reference symbols in the various drawings indicate like elements.

DETAILED DESCRIPTION

Figure 1:
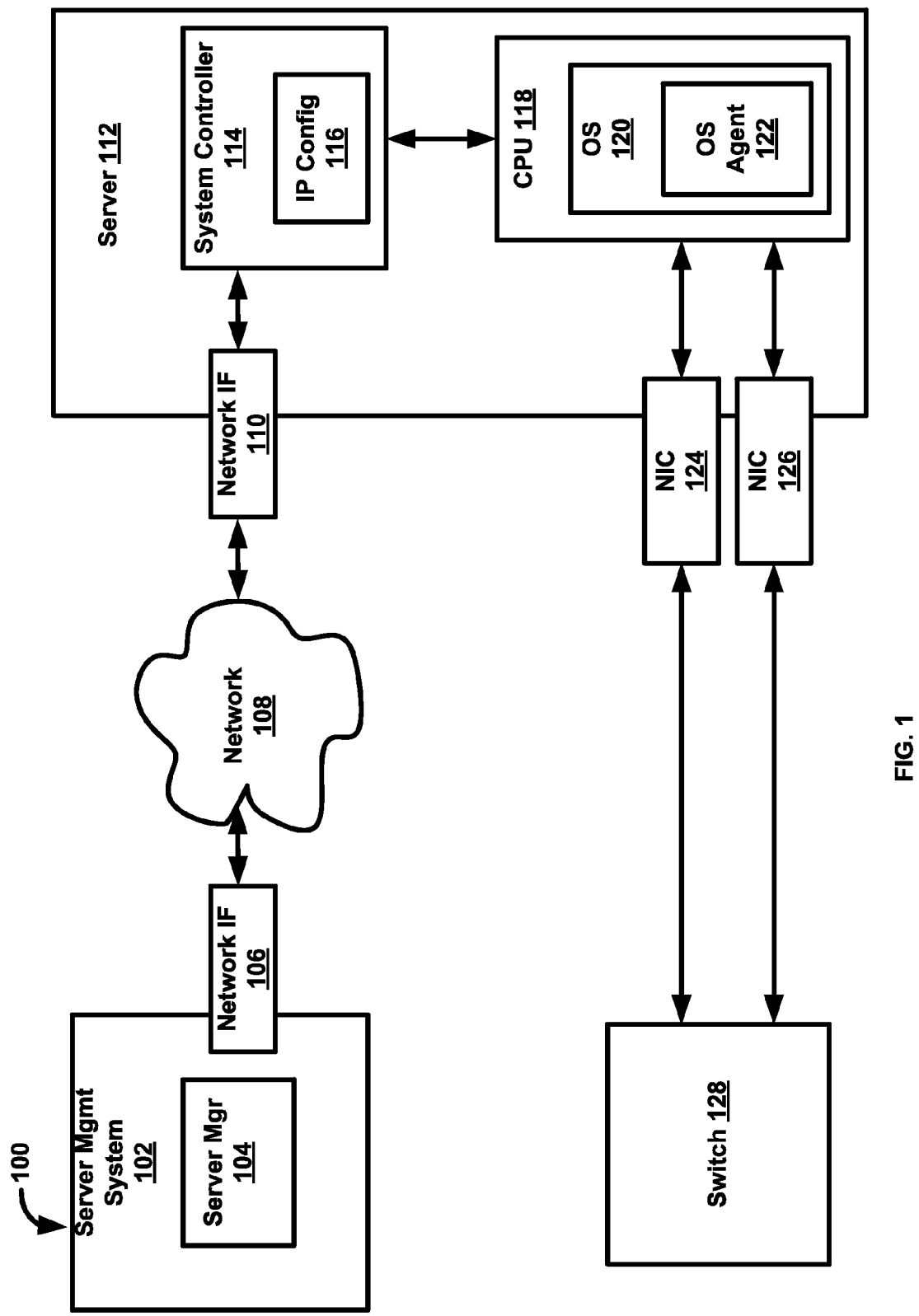
FIG. 1 illustrates a block diagram of example system for out-of-band configuration of an IP address on a computing device.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and members have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented.

The term "coupled" is defined as connected, whether directly or indirectly through intervening members, and is not necessarily limited to physical connections. The connection can be such that the objects are permanently connected or releasably connected. The term "substantially" is defined to be essentially conforming to the particular dimension, shape or other word that substantially modifies, such that the member need not be exact. For example, substantially cylindrical means that the object resembles a cylinder, but can have one or more deviations from a true cylinder. The term "comprising," when utilized, means "including, but not necessarily limited to"; it specifically indicates open-ended inclusion or membership in the so-described combination, group, series and the like.

FIG. 1 illustrates a block diagram of example system 100 for out-of-band configuration of an IP address on a computing device (e.g. a server). In some implementations, server 112 (e.g. an application server, web server, mail server, mobile server, file server, host server, rack mounted server, etc.) can be configured with an IP address using an out-of-band connection (e.g. a connection using a dedicated channel independent of an operating system). For example, out-of-band configuration of the server's IP address can be performed by system controller 114. System controller 114 can be a microcontroller that operates independently of central processing unit (CPU) 118 and operating system (OS) 120. For example, system controller 114 can be a baseboard management controller (BMC). A BMC can be a specialized service processor that runs independently of a CPU.

In some implementations, system controller 114 can receive the IP address from a remote management system. For example, the remote management system can be server management system 102. In some implementations, server manager system 102 can include server manager application 104 (e.g., software that is operated by a system administrator). For example, server manager 104 can provide a user interface that a system administrator can interact with to specify the IP address of server 112.

In some implementations, a system administrator can specify an IP address for server 112 using server manager 104. Server manager 104 can send the specified IP address to system controller 114. For example, server manager 104 can send an IP address configuration request to IP configuration utility 116 running on system controller 114. For example, IP configuration utility 116 can be implemented in software or firmware configured on system controller 114. In some implementations, IP configuration utility 116 can provide interfaces for sending/receiving the status/progress requests as described in detail below. For example, IP configuration utility 116 can include interfaces for 1) setting a server's IP address, 2) getting a server's IP address, 3) setting a progress status, and 4) getting a progress status. For example, the configuration request can be sent by the server manager 104 to system controller 114 (e.g., IP configuration utility 116) using the interface for setting the server IP address. Since system controller 114 operates independently of CPU 118, system controller 114 can receive the IP address from server manager 104 before CPU 118 and/or operating system 120 are booted up (e.g., before powered on, before initialized, while in a low power state, idle, etc.).

In some implementations, IP configuration utility 116 can operate independently of the other functions of system controller 114. For example, when system controller 114 is a BMC, the BMC's primary function is to monitor the physical state of server 112. IP configuration utility 116 can operate independently of the BMC's monitoring functions.

In some implementations, the IP address configuration request can be sent to IP configuration utility 116 through a network interface of system controller 114. For example, the configuration request can be sent using network interfaces (IFs) 106, 110, which are coupled to network 108 (e.g. LAN, WLAN, WAN, Internet, etc.). Network IF 110 can be a dedicated network IF of system controller 114 that allows for out-of-band communication between server management system 102 and system controller 114.

In some implementations, IP configuration utility 116 can store the specified IP address in memory associated with system controller 114. For example, IP configuration utility 116 can store the IP address received from server manager 104 in non-volatile memory (e.g., NVRAM, read-only memory, flash memory, FRAM, etc.) corresponding to system controller 114.

In some implementations, IP configuration utility can provide the configured IP address to operating system agent 122. For example, both system controller 114 and CPU 118 can be housed on server 112. CPU 118 can be configured to support operating system (OS) 120 (e.g. UNIX, versions of the Microsoft Windows® operating system, distributions of the Linux® operating system, and any operating system supporting the functions disclosed herein). Operating system 120 can be configured with OS agent 122 (e.g., process, application, utility) which can interact with IP configuration utility 116 to configure the IP address for server 112. In some implementations, OS agent 122 can be a software application, process or utility that is pre-installed onto OS 120.

In some implementations, OS agent 122 can request the IP address from system controller 114. For example, upon booting up (e.g., powering on, initializing the BIOS, initializing the operating system) server 112, and periodically thereafter, IP configuration utility 116 can receive an IP address request from OS agent 122 requesting the IP address that IP configuration utility 116 received from server manager 104. In response to receiving the IP address request, IP configuration utility 116 can send the requested IP address to OS agent 122. Once OS agent 122 receives the IP address from IP configuration utility 116, OS agent 122 can use various operating system commands (e.g., ifconfig, ipconfig, etc.) to configure the IP address of server 112 based on the received IP address.

In some implementations, once server 112 is configured with the IP address received from system controller 114, server 112 can advertise its IP address to other network devices. For example, once OS agent 122 receives the IP address from IP configuration utility 116, OS agent can configure server 112 (e.g., operating system 120) to use the received IP address. The operating system 120 can send IP address advertising packets out to the network using network interface controllers (NICs) 124, 126, for example. NICs 124, 126 can transmit the IP address advertising packets to switch 128 (e.g. a top-of-rack switch) so that switch 128 can generate the appropriate routing and forwarding tables.

In some implementations, system controller 114 can receive the IP address from server management system 102 before server 112 is booted up. For example, system controller 114 operates out-of-band, and so is adapted to function independently of CPU 118 and OS 120. As such, system controller 114 is able to process the configuration request even though server 112 is not booted up or powered on. Alternatively, after booting up, system controller 114 can receive the IP address from server management system 102 while server 112 is in a low power or idle state. For example, low power and idle states save power by halting instruction to stop a CPU from functioning until an interruption occurs. Because system controller 114 operates out-of-band and independently of the operating system and CPU, the configuration request can be received and processed without interrupting server 112 from the idle state.

In some implementations, more than one server IP address can be configured. For simplicity, only one server is discussed and illustrated. However, it is understood that more than one server can be implemented in accordance with the teachings herein. For example, multiple servers, each with their own system controller 114, IP configuration utility, CPU, OS, OS agent, and NICs are coupled to a single server management system through a network IF, each network IF being a dedicated IF for each server. The server management system, through the server manager, can send multiple configuration requests to multiple system controllers (e.g. BMCs) to configure the multiple servers with different IP addresses. This can be accomplished prior to booting up the servers, or while the servers are in a low power or idle state according to the teachings herein.

Figure 2:
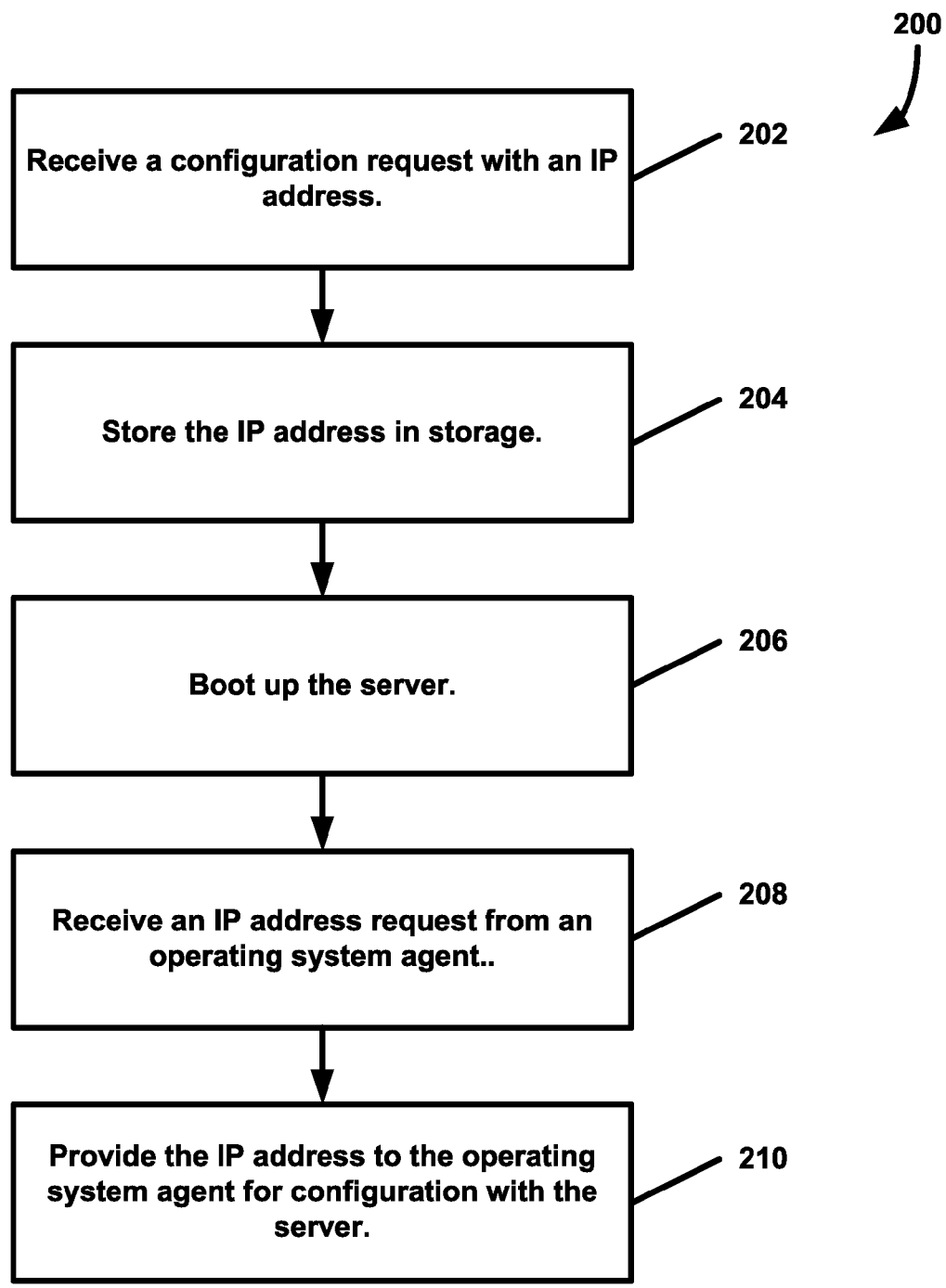
FIG. 2 is a flow diagram of an example process for a remote IP configuration using a system controller.

Referring to FIGS. 1 and 2, FIG. 2 is a flow diagram 200 of an example process for a remote IP configuration using a system controller. The method described below can be carried out using the configurations illustrated in FIG. 1, for example, and various elements of these figures are referenced in explaining the example method. Each block shown in FIG. 2 represents one or more processes, methods or subroutines, carried out in the example method. Furthermore, the illustrated order of blocks is illustrative only and the order of the blocks can change according to the present disclosure. Additional blocks can be added or fewer blocks may be utilized, without departing from this disclosure. The example method begins at block 202.

At block 202, a system controller can receive a configuration request to configure an IP address of the server. For example, the configuration request can be a request received from a server management system that specifies an IP address for the server. The request can be received using an out-of-band communication channel (e.g., system controller dedicated network interface) that operates independently of the CPU. Thus, in some implementations, the IP address can be configured with system controller 114 even while the server is powered down, idle, or otherwise not operational (e.g., the server has failed in some way).

In some implementations, system controller 114 can maintain a variable (e.g., indicator flag) to indicate when an IP address update is in progress. For example, system controller 114 (e.g., IP configuration utility 116) can send an indicator flag value to the OS agent 122 and to server manager 104 to indicate when system controller 114 has been configured with an IP address and when the IP address has be configured on server 112. For example, upon receiving the specified IP address from server management system 102, system controller 114 can set the value of an indicator flag to "1" to indicate that an IP address update/set operation is in progress (e.g., a new IP address has been received but not set on the server yet). Prior to receiving the specified address, the default value of the indicator flag is set to "0," for example, indicating that there is no new IP address to configure on the server or that the process for setting the previously specified IP address is complete. The indicator flag can be stored in memory associated with system controller 114.

At block 204, the system controller can store the specified IP address in a storage associated with the system controller. For example, system controller 114 can store the specified IP in memory and responds to server management system 102 that the IP address was stored by returning a indicator flag value of "1." Server management system 102 can present a response to the system administrator (e.g., on a graphical user interface) indicating that the IP address configuration is in progress.

In some implementations, server manager 104 can send a status request to system controller 114 regarding the status of the IP configuration. For example, server manager 104 can periodically send a status request to IP configuration utility 116 on system controller 114 to determine if the previously specified IP address has be set on server 112. IP configuration utility 116 can respond to the status request with a "1" value when the IP address is still pending (e.g., has not been set on server 112) or with a "0" value when the IP address has been set on server 112. Upon receiving a value of "1" from system controller 114, server manager 104 can be configured to wait and send another status request according to a predetermined time interval.

At block 206, server 112 is booted up. In some implementations, system controller 114 boots up server 112. For example, system controller 114 can receive a boot up request from server manager 104, causing system controller 114 to boot up server 112. Alternatively, system controller 114 can be programmed to automatically boot up server 112 after receiving the specified IP address from server manager 104.

At block 208, the system controller receives an IP address request from an operating system (OS) agent for the specified IP address. For example, IP configuration utility 116 can receive a progress request from an OS agent 122, and responds with the value of the indicator flag. A "0" means the IP address does not need updating (e.g., there is no IP address to be set). A "1" means that the IP address needs to be updated (e.g., the IP configuration utility 116 has received a new IP address that has not been set on the server yet).

At block 210, the system controller provides the specified IP address to the OS agent in response to the IP address request. For example, when the value of the status indicator flag is "1" (e.g., a new IP address needs to be set on server 112), IP configuration utility 116 can send a flag value of "1" to OS agent 122 to indicate that the IP address needs updating. When the IP address needs updating, OS agent 122 can request the new IP address and configure the IP address of the server based on the IP address received from IP configuration utility 116.

In some implementations, upon configuring server 112 with the IP address received from IP configuration utility 116, OS agent 122 can confirm to IP configuration utility 116 that the IP address was successfully configured. IP configuration utility 116 can then set the progress indicator flag to "0" to indicate that the IP address configuration of server 112 is complete.

In some implementations, server management system 102 can query system controller 114 according to a predetermined time interval to check on the status of the IP address setting at server 112. For example, IP configuration utility 116 can receive the query and can respond with a flag value of "0" when the IP address configuration process at server 112 is complete. When server manager 104 receives the indicator flag value of "0," server manager 104 then presents a progress complete message to the system administrator (e.g., using a graphical user interface of server manager 104) confirming that the IP address was updated successfully.

Figure 3:
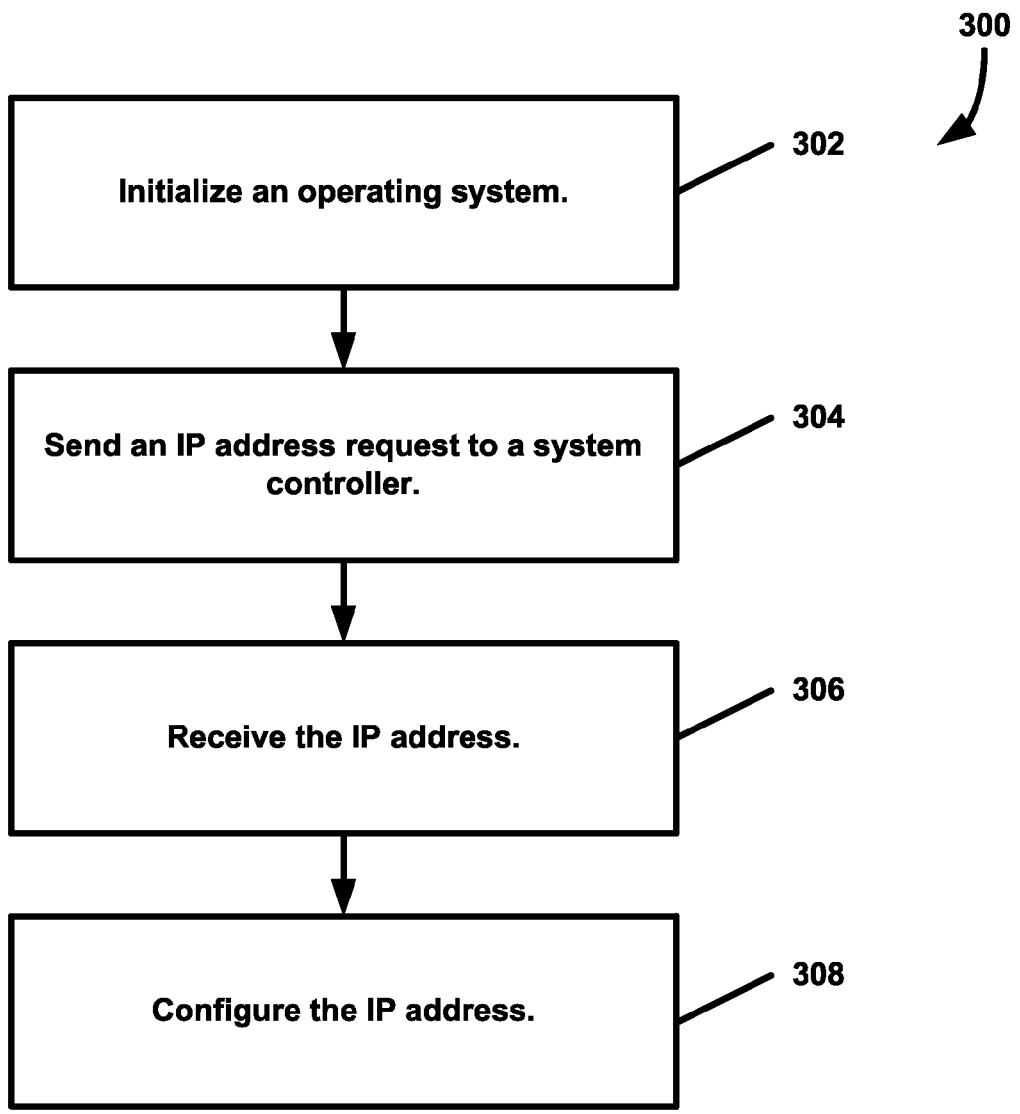
FIG. 3 is a flow diagram of an example method for a remote IP configuration process using an operating system agent.

Referring to FIGS. 1 and 3, FIG. 3 is a flow diagram 300 of an example method for a remote IP configuration process using an operating system agent. The method described below can be carried out using the configurations illustrated in FIG. 1, for example, and various elements of these figures are referenced in explaining the example method. Each block shown in FIG. 3 represents one or more processes, methods or subroutines, carried out in the example method. Furthermore, the illustrated order of blocks is illustrative only and the order of the blocks can change according to the present disclosure. Additional blocks can be added or fewer blocks may be utilized, without departing from this disclosure. The example method begins at block 302.

At block 302, an operating system (OS) of a server is initialized. For example, during initialization, OS agent 122 can send a progress request to system controller 114 to query whether the server's IP address needs to be updated. In one version the progress request is sent periodically according to a predetermined time interval. When OS agent 122 receives a "0", the IP address does not need updating, and OS agent 122 does nothing and waits to send another progress request according to the predetermined time interval. If OS agent receives a "1", the IP address needs to be updated.

At block 304, during initialization of the OS, the OS agent sends an IP address request to the system controller for an IP address of the server. For example, OS agent 122 can send an IP address request to system controller 114 (e.g., IP configuration utility 116) when OS agent 122 receives a flag value of "1" indicating that the IP address needs updating.

At block 306, the OS agent receives a specified IP address from the system controller. For example, system controller 114 can receive the IP address request from OS agent 122. System controller 114 can responds to the IP address request by sending the IP address received from server manager 104 to OS agent 122.

At block 308, the OS agent configures the IP address of the server based on the specified IP address. For example, OS agent 122 can use various operating system commands, such as "ifconfig" in LINUX, to set the server's IP address to the specified IP address. Server 112 then configures the specified IP address to NIC 124 or 126 that was indicated by the system administrator. In some implementations, OS agent 122 can confirm to system controller 114 that the IP address was successfully configured on server 112 by sending a reset command to system controller 114 to set the flag back to "0".

Figure 4:
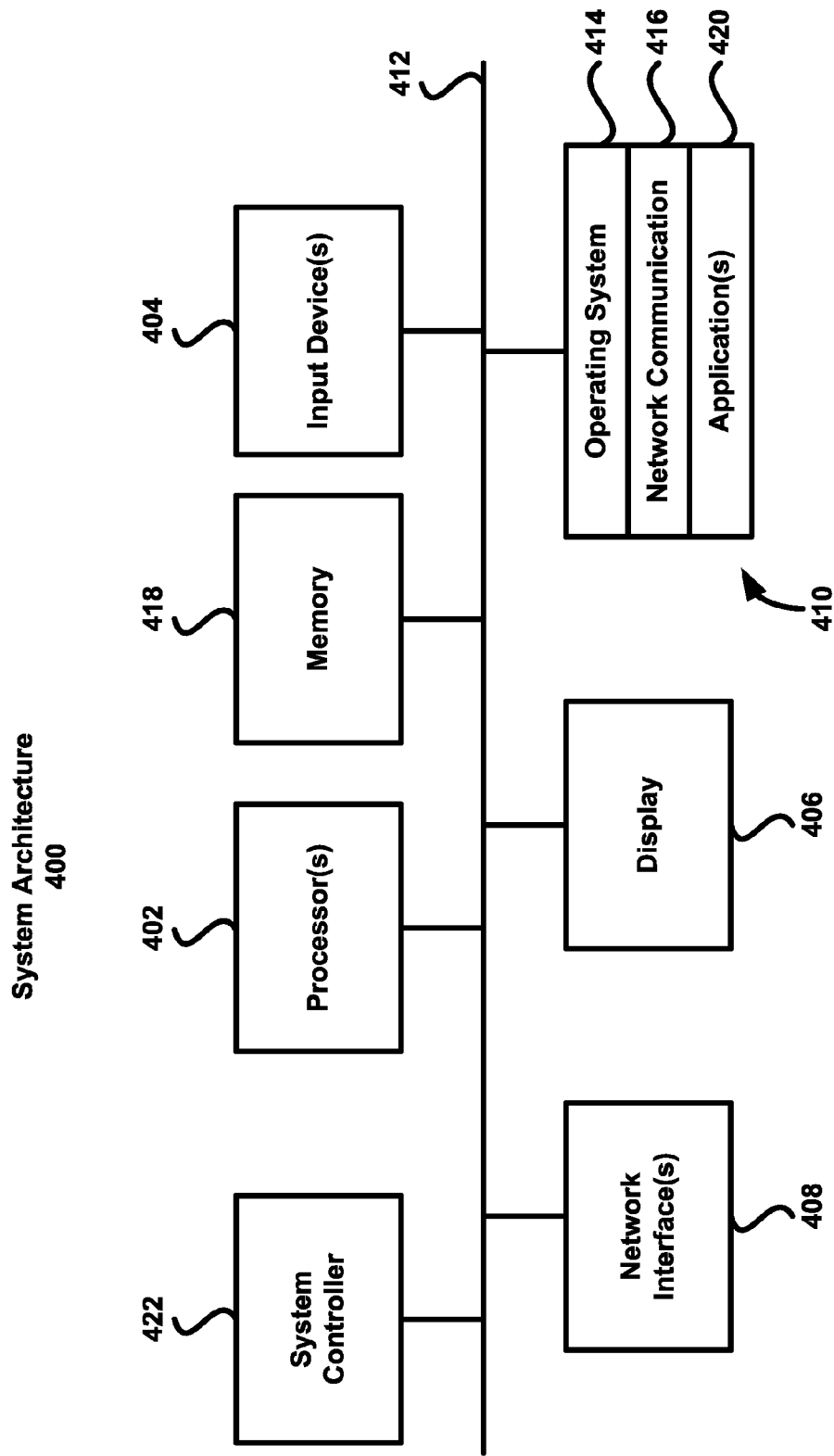
FIG. 4 is a block diagram of an example system architecture 400 implementing the features and processes of FIGS. 1-3.

FIG. 4 is a block diagram of an example system architecture 400 implementing the features and processes of FIGS. 1-3. The architecture 400 can be implemented on any electronic device that runs software applications derived from compiled instructions, including without limitation personal computers, servers, smart phones, media players, electronic tablets, game consoles, email devices, etc. In some implementations, the architecture 400 can include one or more processors 402, one or more input devices 404, one or more display devices 406, one or more network interfaces 408 and one or more computer-readable mediums 410. Each of these components can be coupled by bus 412.

In some implementations, system architecture 400 can correspond to a single server in a rack of servers. Various rack configurations can be implemented. For example, a rack can include multiple chassis and each chassis can contain multiple servers. Each server in the rack can be connected by various hardware components (e.g., backbone, middle plane, etc.). Each server in the rack can be connected to a network through a top-of-rack switch.

Display device 406 can be any known display technology, including but not limited to display devices using Liquid Crystal Display (LCD) or Light Emitting Diode (LED) technology. Processor(s) 402 can use any known processor technology, including but are not limited to graphics processors and multi-core processors. Input device 404 can be any known input device technology, including but not limited to a keyboard (including a virtual keyboard), mouse, track ball, and touch-sensitive pad or display. Bus 412 can be any known internal or external bus technology, including but not limited to ISA, EISA, PCI, PCI Express, NuBus, USB, Serial ATA or FireWire.

Computer-readable medium 410 can be any medium that participates in providing instructions to processor(s) 402 for execution, including without limitation, non-volatile storage media (e.g., optical disks, magnetic disks, flash drives, etc.) or volatile media (e.g., SDRAM, ROM, etc.). The computer-readable medium (e.g., storage devices, mediums, and memories) can include, for example, a cable or wireless signal containing a bit stream and the like. However, when mentioned, non-transitory computer-readable storage media expressly exclude media such as energy, carrier signals, electromagnetic waves, and signals per se.

Computer-readable medium 410 can include various instructions for implementing operating system 414 (e.g., Mac OS®, Windows®, Linux, etc.) and applications 420 such as computer programs. The operating system can be multi-user, multiprocessing, multitasking, multithreading, real-time and the like. The operating system 414 performs basic tasks, including but not limited to: recognizing input from input device 404; sending output to display device 406; keeping track of files and directories on computer-readable medium 410; controlling peripheral devices (e.g., disk drives, printers, etc.) which can be controlled directly or through an I/O controller; and managing traffic on bus 412. Operating system 414 can include an agent (e.g., software application, utility, program, etc.) configured to request an IP address from system controller 422 and invoke operating system functions for configuring the server IP address based on the IP address received from the system controller 422, as described above with reference to FIGS. 1-3. Network communications instructions 416 can establish and maintain network connections (e.g., software for implementing communication protocols, such as TCP/IP, HTTP, Ethernet, etc.).

Memory 418 can include high-speed random access memory and/or non-volatile memory, such as one or more magnetic disk storage devices, one or more optical storage devices, and/or flash memory (e.g., NAND, NOR). The memory 418 (e.g., computer-readable storage devices, mediums, and memories) can include a cable or wireless signal containing a bit stream and the like. However, when mentioned, non-transitory computer-readable storage media expressly exclude media such as energy, carrier signals, electromagnetic waves, and signals per se. The memory 418 can store an operating system, such as Darwin, RTXC, LINUX, UNIX, OS X, WINDOWS, or an embedded operating system such as VxWorks.

System controller 422 can be a service processor that operates independently of processor 402. In some implementations, system controller 422 can be a baseboard management controller (BMC). For example, a BMC is a specialized service processor that monitors the physical state of a computer, network server, or other hardware device using sensors and communicating with the system administrator through an independent connection. The BMC is configured on the motherboard or main circuit board of the device to be monitored. The sensors of a BMC can measure internal physical variables such as temperature, humidity, power-supply voltage, fan speeds, communications parameters and operating system (OS) functions.

In some implementations, the BMC runs independently of processor 402 and hence in the event of processor 402, memory 418 or any other hardware failure, the BMC can still provide services and remain functional. In some implementations, the BMC can start running as soon as a server is plugged into a power source (e.g., power supply unit, backup power unit, power distribution unit, etc.). For example, the power button on the front side of the blade does not turn on/off the BMC. The management connectivity to the BMC is through two BMC-dedicated 100BASE-T interfaces on the blade to the chassis' internal management. However at any given instance the connectivity to the BMC is only through one of the two 100BASE-T interfaces, the other one being redundant. A system administrator (e.g., using server manager 104) can interact (e.g., configure, monitor, etc.) with system controller 422 using the controller's intelligent platform management interface (IPMI). For example, the IPMI interface can be used to configure system controller 422 with the IP address for the server. Alternatively, system controller 422 can be configured (e.g., with software, firmware, etc.) with a non-IMPI interface (e.g., custom interface) that allows a system administrator to remotely configure the server's IP address using system controller 422.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network. The relationship of client and server arises by virtue of computer programs running on the respective computers and having a client-server relationship to each other.

One or more features or steps of the disclosed embodiments can be implemented using an application programming interface (API). An API can define one or more parameters that are passed between a calling application and other software code (e.g., an operating system, library routine, function) that provides a service, that provides data, or that performs an operation or a computation.

The API can be implemented as one or more calls in program code that send or receive one or more parameters through a parameter list or other structure based on a call convention defined in an API specification document. A parameter can be a constant, a key, a data structure, an object, an object class, a variable, a data type, a pointer, an array, a list, or another call. API calls and parameters can be implemented in any programming language. The programming language can define the vocabulary and calling convention that a programmer will employ to access functions supporting the API.

In some implementations, an API call can report to an application the capabilities of a device running the application, such as input capability, output capability, processing capability, power capability, communications capability, etc.

A number of implementations have been described. Nevertheless, it will be understood that various modifications may be made. For example, other steps may be provided, or steps may be eliminated, from the described flows, and other components may be added to, or removed from, the described systems. Accordingly, other implementations are within the scope of the following claims.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A method comprising:
   before booting up a computing device,
      receiving, at a system controller of the computing device via an out-of-band communication channel from a remote management system, a configuration request to configure an internet protocol (IP) address of the computing device, the configuration request specifying an IP address reserved for the computing device; and
      storing the specified IP address in a storage associated with the system controller; and
   after booting up the computing device,
      receiving, at the system controller, an IP address request from an operating system agent for the specified IP address;
      configuring the IP address of the computing device based on the specified IP address;
      receiving, using the system controller of the computing device, a new IP address via the out-of-band communication channel from the remote management system; and
      configuring the IP address of the computing device based on the new IP address.

2. The method of claim 1 wherein the system controller implements a command function for facilitating communication between the system controller and the operating system agent.

3. The method of claim 2 wherein the command function operates independently of the system controller's other functions.

4. The method of claim 1 further comprising, in response to receiving the IP address request from the operating system agent,
   determining, at the system controller, whether or not the IP address needs to be updated;
   upon determining that the IP address does not need to be updated, sending from the system controller to the operating system agent a first progress response flag indicating that the IP address does not need to be updated; and
   upon determining that the IP address needs to the updated, sending from the system controller to the operating system agent a progress response flag value of "1" indicating that the IP address does need to be updated.

5. The method of claim 4 wherein the IP address request is received from the operating system agent periodically, according to a time interval.

6. The method of claim 1 wherein the configuration request is received from an administrator through a network interface of the system controller.

7. The method of claim 1 wherein the system controller operates independently of the operating system agent.

8. The method of claim 1 wherein the system controller comprises a baseboard management controller (BMC).

9. The method of claim 1 wherein the IP address is configured with the system controller while the computing device is turned off.

10. The method of claim 1 wherein a management system communicates with the system controller through a network interface (NI) of the system controller.

11. The method of claim 1 further comprising, before configuring the IP address of the computing device, providing the specified IP address to the operating system agent, where the operating system agent configures the IP address based on the specified IP address.

12. An apparatus comprising:
a baseband management controller (BMC);
one or more application processors; and
a computer-readable medium including one or more sequences of instructions which when executed by the BMC causes the BMC to:
before booting up the application processors, receive at the BMC via an out-of-band communication channel from a remote management system, a configuration request to configure an internet protocol (IP) address of the computing device, the configuration request specifying an IP address for the computing device;
store the specified IP address in storage associated with the system controller;
boot up the computing device;
receive, at the system controller, an IP address request from an operating system agent for the specified IP address;
configure the IP address of the computing device based on the specified IP address;
receive, using the BMC of the computing device, a new IP address via the out-of-band communication channel from a remote management system; and
configure the IP address of the computing device based on the new IP address.

13. A method comprising:
initializing an operating system of a computing device;
during initialization of the operating system, sending, by an operating system agent, an IP address request to a system controller for an internet protocol (IP) address of the computing device;
receiving, at the operating system agent, a specified IP address from the system controller;
configuring the IP address of the computing device based on the specified IP address;
receiving, using the system controller of the computing device, a new IP address via an out-of-band communication channel from a remote management system; and
configuring the IP address of the computing device based on the new IP address.

14. The method of claim 13 wherein the operating system agent comprises a software application.

15. The method of claim 13 wherein the operating system agent communicates with the system controller through a system interface (SI).

16. The method of claim 13 wherein the IP address request is sent periodically according to a time interval.

17. The method of claim 13 wherein the computing device's IP address is configured by the operating system agent using system network commands.

18. The method of claim 13 wherein the specified IP address is stored on a network interface controller (NIC).

19. The method of claim 13 wherein the system controller comprises a baseboard management controller (BMC).

20. The method of claim 19 wherein the operating system agent operates on a computer processing unit (CPU) that is separate from the BMC.

21. The method of claim 13 wherein the operating system agent configures the IP address of the computing device based on the specified IP address.

22. An apparatus comprising:
a baseboard management controller (BMC);
one or more application processors; and
a computer-readable medium including one or more sequences of instructions which when executed by the one or more application processors causes the application processors to:
initialize an operating system of a computing device;
during initialization of the operating system, send, by an operating system agent, an IP address request to the BMC for an internet protocol (IP) address of the computing device;
receive, at the operating system agent from the BMC, a specified IP address from the system controller;
configure the IP address of the computing device based on the specified IP address;
receive, using the BMC of the computing device, a new IP address via an out-of-band communication channel from a remote management system; and
configure the IP address of the computing device based on the new IP address.

* * * * *